(12) United States Patent
Held et al.

(10) Patent No.: US 6,195,970 B1
(45) Date of Patent: Mar. 6, 2001

(54) TOOL WITH AN ELECTRIC MOTOR AS THE DRIVE

(75) Inventors: Peter Held, Scheuerfeld; Ulrich Pfau, Daaden, both of (DE)

(73) Assignee: Wolf-Geräte Vertriebsgesellschaft GmbH KG (DE)

( * ) Notice: Subject to any disclaimer, the term of this patent is extended or adjusted under 35 U.S.C. 154(b) by 0 days.

(21) Appl. No.: 09/155,910

(22) PCT Filed: Apr. 5, 1997

(86) PCT No.: PCT/EP97/01707

§ 371 Date: Oct. 8, 1998

§ 102(e) Date: Oct. 8, 1998

(87) PCT Pub. No.: WO97/38468

PCT Pub. Date: Oct. 16, 1997

(30) Foreign Application Priority Data

Apr. 10, 1996 (DE) ............................................. 196 14 199

(51) Int. Cl.[7] ................ A01D 34/00; H02J 7/00
(52) U.S. Cl. ................. 56/16.7; 56/17.5; 320/113
(58) Field of Search .................... 56/17.5, 16.7, 56/2; 439/952, 511, 507, 512, 513, 500; 320/107, 109, 111, 113

(56) References Cited

U.S. PATENT DOCUMENTS

| | | | |
|---|---|---|---|
| 3,493,915 | * 2/1970 | Cox | 439/925 |
| 3,581,480 | * 9/1969 | O'Connor et al. | 56/11.9 |
| 3,696,593 | 10/1972 | Thorud et al. | 56/10.5 |
| 5,085,043 | * 2/1992 | Hess et al. | 56/10.5 |
| 5,301,494 | * 4/1994 | Peot et al. | 56/10.5 |
| 5,321,203 | * 6/1994 | Goto et al. | 439/511 |
| 5,402,008 | * 3/1995 | St. John | 439/188 |
| 5,449,301 | * 9/1995 | Hanna et al. | 439/510 |
| 5,606,851 | * 3/1997 | Bruener et al. | 56/11.9 |

FOREIGN PATENT DOCUMENTS

| | | |
|---|---|---|
| 4406879 | 7/1995 | (DE) . |
| 9401993 | 3/1994 | (WO) . |

* cited by examiner

*Primary Examiner*—Thomas B. Will
*Assistant Examiner*—Meredith Petravick
(74) *Attorney, Agent, or Firm*—Ostrolenk, Faber, Gerb & Soffen, LLP

(57) ABSTRACT

In a tool, the terminal contacts of a battery pack which can be removed from the tool can be connected to the terminal contacts of the drive motor via a bow plug, and for this purpose the terminal contacts of battery pack and motor are arranged parallel to one another in the installed state of the battery pack. The battery pack can only be separated from the tool after the bow plug has been pulled off. Instead of the bridging bow plug, it is possible to attach a charging plug, which connects the terminals of the battery pack to a charging appliance.

10 Claims, 3 Drawing Sheets

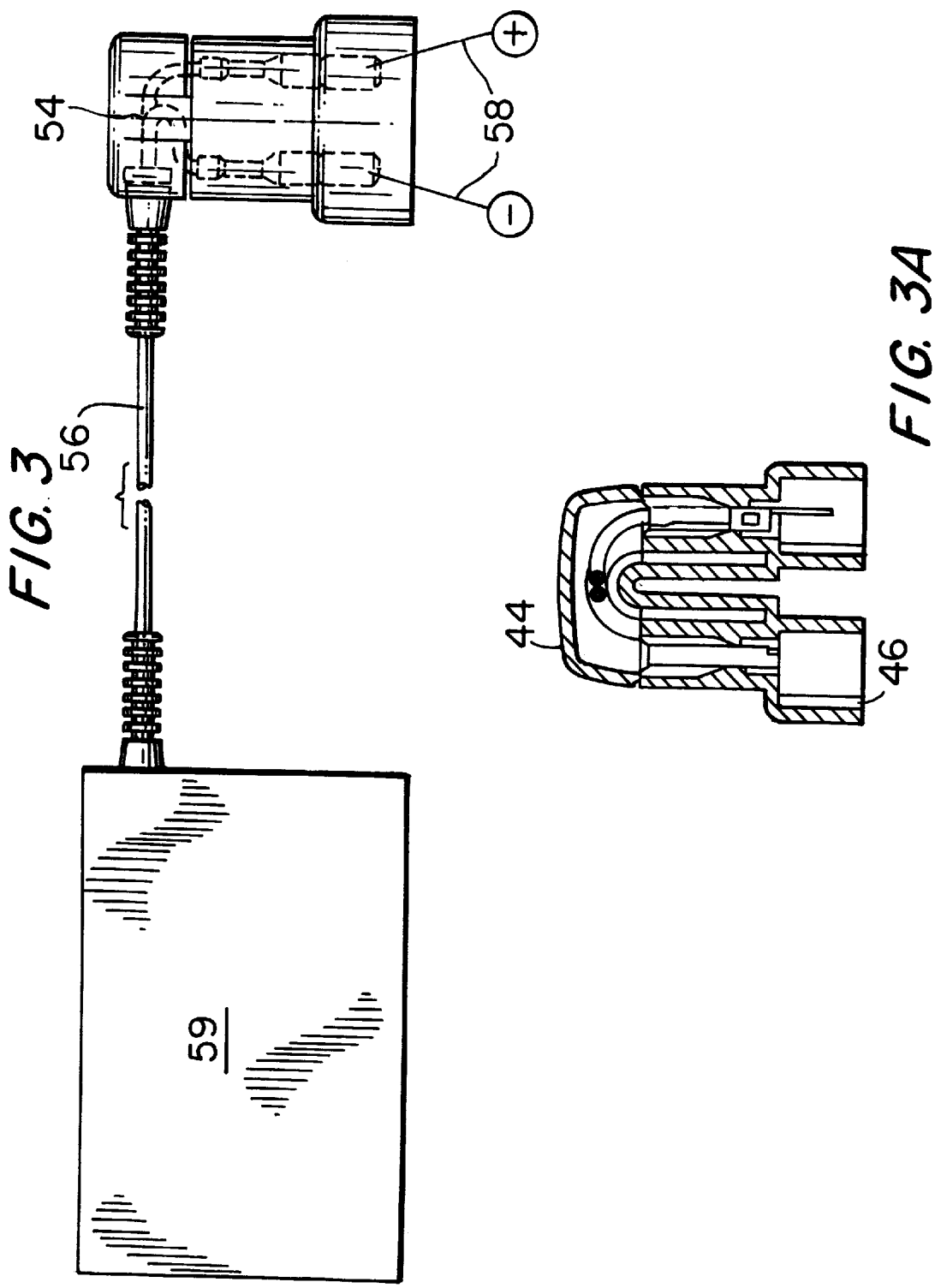

TOOL WITH AN ELECTRIC MOTOR AS THE DRIVE

BACKGROUND OF THE INVENTION

Tool with an electric motor as its drive The invention relates to a tool, in particular to a garden tool, e.g. a lawnmower, with an electric motor as its drive and an exchangeable, rechargeable battery, the electrical terminals of which can be connected via a plug device to the motor terminals.

In small, battery-operated electric tools, for example hand drills or hand held screwdrivers which are operated by electric motors, it is customary to provide a battery pack which is equipped with plug-in contacts which can be plugged into mating terminals on the electric hand held tool or on a charging appliance. In this case, the plug-in contacts and the mating terminals each form part of a plug coupling, some of the connection means comprising contact pins which project in the plug-in direction.

A battery pack of this kind for electric hand held tools is known from DE 94 21 382. In this case, in addition to the plug-in contacts which make the electrical connection to the drive motor or to the charging appliance, form-fitting connections which rule out polarity reversal are also provided. In the case of the known battery pack, electrical connection is inevitably made when putting the coupling parts together. In order to prevent unintentional short-circuiting of the battery pack which is isolated from the hand tool, the coupler connections of this kind cannot readily be employed because safety considerations dictate that it is necessary to provide an additional switch to interrupt the flow of current in the immediate vicinity of the battery, in order to make the tool childproof.

Lawnmowers with exchangeable battery packs in which terminals are arranged on the outside of the battery pack are known, which terminals, when the battery pack is inserted into a battery guide in the casing of the tool inevitably makes contact with the terminals situated in the tool. A switch, which is generally designed as a detachable-key switch, is provided as a safety switch on the lawnmower chassis in the vicinity of the battery. To recharge the battery, terminals for the insertion of a socket connector are provided in the tool casing via which connector a charging appliance supplies current to recharge the battery. The battery can also be recharged after it has been removed from the tool, using the charging appliance which can be connected to the battery terminals.

In the case of a tool which is described in WO 94/01993 and is designed as a lawnmower, the bow plug is designed as an overload protector and contains either a fuse or an overload circuit breaker. The battery pack, which in the known tool is installed fixedly in the chassis, has a charging plug, a power transformer and a rectifier which is connected to the battery. The charging plug is connected to the mains in order to recharge the battery. The sockets of the mains plug can only be pushed onto the charging plug pins when a slide lying above them has been displaced laterally, and its displacement into the open position is only possible when the bow plug has been pulled off the battery terminals, thus isolating the motor from the battery terminals. As long as the slide is in the displaced position, releasing the mains connection, the safety bow plug cannot be plugged in, so that the connection between motor and battery remains interrupted as long as the mains plug is connected to the tool.

SUMMARY OF THE INVENTION

The invention is based on the object of providing a tool with a safety plug-in contact connector in which the electrical contact connection between the terminals of an exchangeable battery pack and motor terminals or charging appliance terminals cannot be made only by inserting the battery pack into the tool, but rather further plug-in functions are required.

The object is achieved by the invention as described herein below. In this case, only by plugging on the bow plug is electrical connection possible, and this electrical connection via the bow plug can only be closed when the battery pack has been inserted correctly in the tool, so that the motor terminals and the battery pack terminals lie parallel to one another at the same height, ready to receive the bow plug. This bow plug brings about a reliable electrical isolation between battery and motor, and only after the bow plug has been pulled off, i.e. after electrical isolation has taken place, is it possible to lift the battery pack out of the corresponding guide in the tool housing, so that the motor can be reliably prevented from switching on when the battery pack is being exchanged. By contrast, the conventional safety switch which is designed, for example, as a detachable-key switch does not prevent this undesirable switching-on of the motor.

Expediently, one of the multipole connectors is fixed to the tool, while the other connector is fixed on the battery pack so that it is also removed when the battery is being exchanged. No additional contact points are required.

According to a further refinement of the invention, the same bow plug may be used as a charging plug, this charging bow plug being fixed to a multipole plug of the battery pack and making the connection to the charging appliance. This could be achieved by providing a further multipole plug on the charging appliance or the supply line in such a manner that the same bow plug connects the multipole plug of the battery pack, which has been removed from the tool, to a multipole plug which is provided on the charging appliance or the supply line. However, this requires the battery to be removed from the tool each time it is to be recharged. For this reason, according to a further refinement of the invention, the charging appliance or the connection line is fitted with a plug which corresponds to the connecting bow plug, can be plugged onto the multipole plug of battery pack or charging appliance and connects these components to one another while the connection is interrupted with respect to the drive motor of the tool. Here too, suitable form-fitting connections prevent the wrong poles from being connected.

The invention allows the bow plug arrangement to be employed for three functions, namely, for safety interruption of current, for current connection with respect to the drive motor and for current connection between the battery pack and charging appliance. Conventional spring contacts and jacks can be used as the plug-in contacts for the multipole plugs and the bow plug, so that the plug connection can be produced in a cost-effective manner.

An exemplary embodiment of the invention is described below with reference to a lawnmower which is illustrated in the drawing, in which:

BRIEF DESCRIPTION OF THE DRAWINGS

FIG. 3 shows a diagrammatic view of a charging appliance;

FIG. 3A shows a diagrammatic view of a charging bow plug used with the charging appliance.

DESCRIPTION OF THE PREFERRED EMBODIMENT

Figure 1:
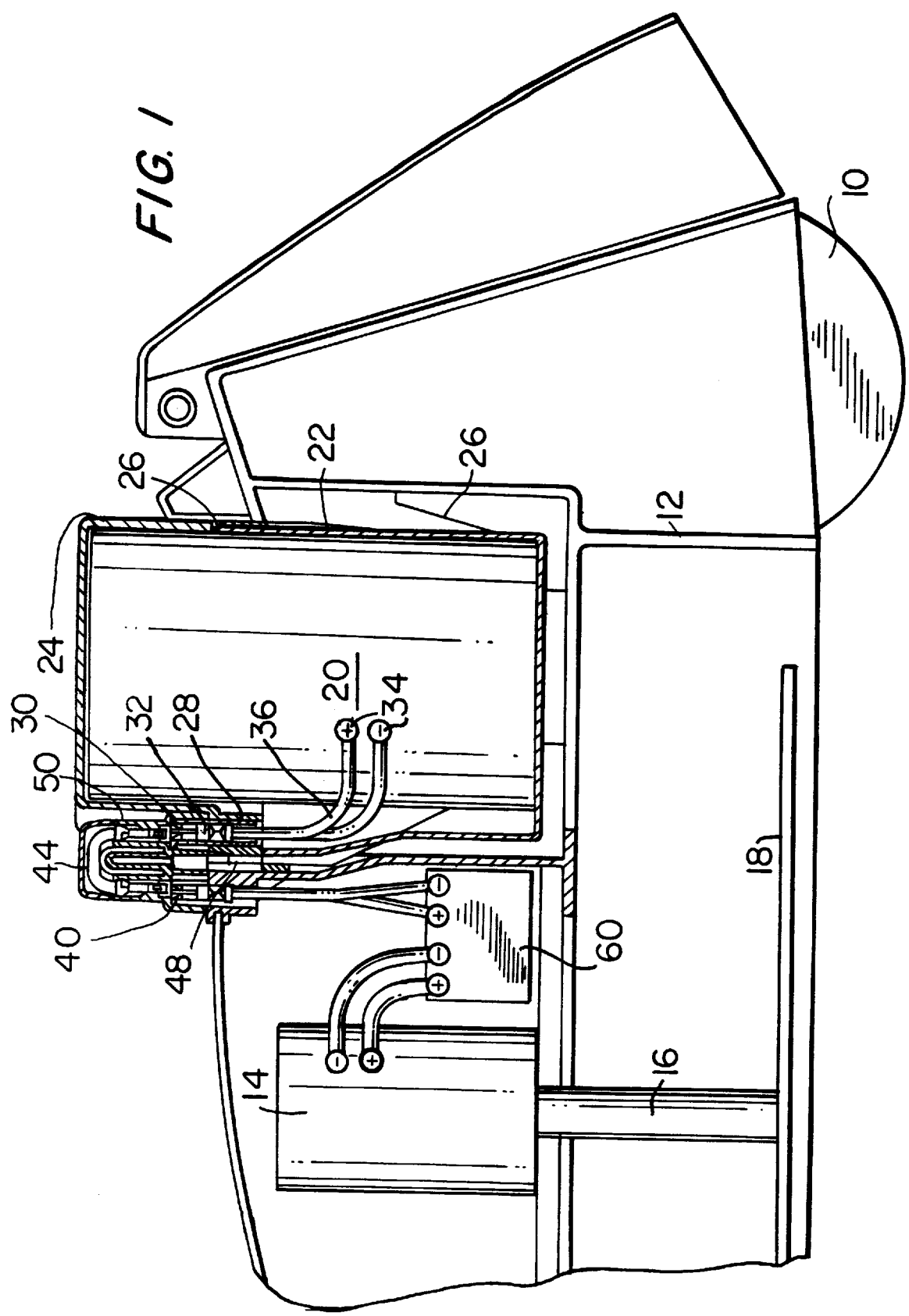
FIG. 1 shows a diagrammatic partial side view of a lawnmower with the plug-in contact connection between battery pack and drive motor.

The chassis 12, which is supported by wheels 10, of a lawnmower bears a DC electric motor 14, the vertically running output shaft 16 of which bears the blades 18, which rotate in a horizontal plane.

Figure 2:
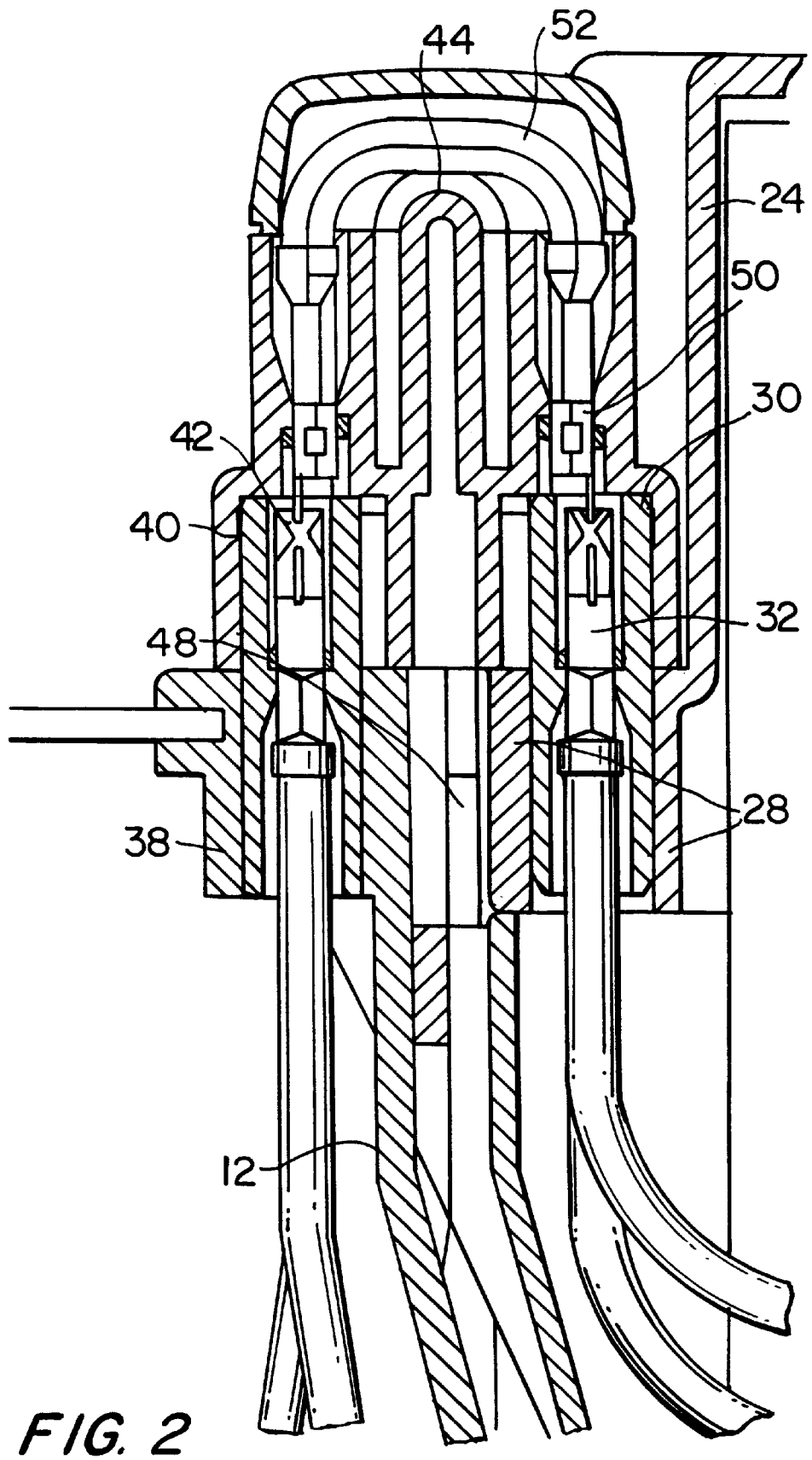
FIG. 2 shows a sectional view, on an enlarged scale, of the plug connector.

A rechargeable battery 20 is accommodated in a two-part battery casing comprising lower part 22 and cover 24. This battery pack comprising battery 20, lower part 22 and cover 24 is inserted in guides 26 of the chassis, which allow the battery pack to be removed vertically and allow the battery casing to be introduced into the chassis a guides 26 include bevels to ensure that the battery pack is guided into the limit position in which the battery pack is supported in a form-fitting manner on all sides. As can be seen in particular from FIG. 2, the cover 24 has a holder 28 for the protecting sleeve 30 of a multipole plug at its lower end which is directed towards the motor and which has two spring contacts 32 arranged parallel to one another and connected to the battery terminals 34 via cables 36. A further multipole plug comprising protecting sleeve 40 and spring contacts 42 is fixed in an insulating piece 38 which is inserted in the chassis of the lawnmower. When the battery pack 20, 22, 24 has been fitted into the lawnmower chassis, the spring contact pairs 32 and 42 lie parallel to one another and at the same vertical position.

The spring contacts 32 and 42 of the two pairs can be connected by means of a bow plug 44. This bow plug has a plug casing which can be plugged onto the protecting sleeves 30 and 40 of the battery pack and of the tool casing, respectively, and a suitable form-fitting connection 46 on the bow plug casing or the multipole plugs prevent the polarity from being reversed. A further form-fitting connection 48 in the form of a T-guide between battery casing cover 24 and tool casing part 38 ensures a fixed connection between the battery pack and tool casing. In this way, relative movements between the two latch-in plugs 30 and 40 and hence between the contact points are minimized.

Contact blades 50, which project parallel to one another in the interior of the bow plug 44 and are bridged in pairs by cable bridges 52, interact with the spring contacts 32 and 42.

As shown in FIG. 3, a plug 54, the shape of which is matched to the bridging bow plug 44, is connected to a charging appliance 59 via a charging cable 56. The charging plug 54 is equipped with contact blades 58 which interact with the spring contacts 32 of the multipole plug 30. The form-fitting connection 46 ensures that the charging plug 54 can only be plugged on in the correct angular position, in which the negative poles and the positive poles are respectively connected to one another. Electrical connection with respect to the drive motor is ruled out.

Interconnecting electrics 60 are accommodated between the terminals of the motor 14 and the multipole plug with the spring contacts 42.

The invention has been described with reference to a lawnmower, but may also be used for other garden tools, such as for example hedge-trimmers or lawn aerators, and also in other tools outside the gardening sector. In accordance with the exemplary embodiment illustrated, the bow plug bridges two pairs of contact springs which are arranged at the same vertical position. However, given a suitable design of the bow plug, they could also be arranged at different vertical positions. A vertical plug-in direction is preferred for ease of operation. However, a different plug-in direction is also to be reserved for consideration.

What is claimed is:

1. A tool comprising:
    a chassis having a battery insertion guide;
    an electric motor having motor terminals;
    a battery pack including a rechargeable battery having battery terminals, wherein the battery pack can be removed from and inserted into the chassis along the guide;
    a battery plug connector fixed to the battery pack for providing electrical connection to the battery terminals;
    a chassis plug connector fixed to the chassis for providing electrical connection to the motor terminals, the battery plug connector and the chassis plug connector being arranged parallel to one another; and
    a pull-off connecting bow plug directly connectable to both the battery plug connector and the chassis plug connector for providing electrical connection between the two plug connectors.

2. The tool as claimed in claim 1 wherein the bow plug has an axis which runs parallel to the guide for the battery pack.

3. The tool as claimed in claim 2, wherein the plug connectors have spring contacts supported by protecting sleeves, which are fixed in a cover of the battery pack and in an insulating piece fitted in the tool chassis, respectively.

4. The tool as claimed in claim 1, wherein the guide has a form-fitting connection which fixes the position of the plug connectors with respect to one another when the battery is inserted in the chassis.

5. The tool as claimed in claim 1, wherein the bow plug can be plugged onto the plug connectors in a direction parallel to the insertion direction of the battery pack.

6. The tool as claimed in claim 1, further comprising a charging plug which corresponds to the bow plug and is connected, via a charging cable, to a charging appliance, wherein the charging plug has contact blades which constitute charging terminal contacts.

7. The tool as claimed as claim 6, wherein the bow plug and the charging plug each have a form-fitting guide.

8. The tool as claimed in claim 6,
    wherein the bow plug includes contact blades, and
    wherein the spring contacts are completely surrounded by the protecting sleeves and interact with the contact blades of the bow plug or of the charging plug.

9. The tool as claimed in claim 1, wherein the tool is designed as a lawnmower and the chassis is a lawnmower chassis.

10. The tool as claimed in claim 1 wherein interconnecting electrical elements are arranged between the motor terminals and the chassis plug connector fixed in the chassis.

* * * * *